United States Patent
Nakamura

(10) Patent No.: US 6,349,800 B1
(45) Date of Patent: Feb. 26, 2002

(54) BICYCLE DISC BRAKE ASSEMBLY

(75) Inventor: Yasushi Nakamura, Hyogo (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/499,307

(22) Filed: Feb. 7, 2000

(51) Int. Cl.$^7$ .............................................. F16D 55/36
(52) U.S. Cl. .................... 188/26; 188/71.5; 188/17; 188/18 A
(58) Field of Search ...................... 188/26, 218, 218 R, 188/24.12, 24.13, 17, 73.44, 73.45, 71.5

(56) References Cited

U.S. PATENT DOCUMENTS

| | | | |
|---|---|---|---|
| 2,893,519 A | * 7/1959 | Martin | 188/71 |
| 2,981,376 A | * 4/1961 | Zeidler | 188/73 |
| 3,530,960 A | * 9/1970 | Otto et al. | 188/218 |
| 3,710,914 A | * 1/1973 | Lowey et al. | 192/107 R |
| 3,949,838 A | 4/1976 | Fuhrman | 188/26 |
| 4,120,536 A | 10/1978 | Bernardi | 301/6 E |
| 4,170,369 A | 10/1979 | Strutman | 280/261 |
| 4,597,486 A | * 7/1986 | Kabayama | 192/107 R |
| 4,844,206 A | * 7/1989 | Casey | 188/18 A |
| 4,863,000 A | * 9/1989 | Patel | 188/170 |
| 4,865,160 A | * 9/1989 | Casey | 188/18 A |
| 5,190,124 A | * 3/1993 | Haneda | 188/218 XL |
| 5,950,772 A | 9/1999 | Buckley et al. | 188/26 |
| 6,164,421 A | * 12/2000 | Nakamura et al. | 188/71.5 |

FOREIGN PATENT DOCUMENTS

| | | |
|---|---|---|
| EP | 699576 A | 3/1996 |
| FR | 2728321 | 6/1996 |
| GB | 2076087 | 11/1981 |
| GB | 2195407 | 4/1988 |
| JP | 5712135 A1 * | 1/1982 |

* cited by examiner

Primary Examiner—Christopher P. Schwartz
Assistant Examiner—Melody M. Burch
(74) Attorney, Agent, or Firm—Shinjyu Global IP Counselors, LLP

(57) ABSTRACT

A bicycle disc brake assembly is provided with a double disc brake rotor with a pair of floating discs and a bicycle disc brake caliper with four friction members. The center or intermediate friction members are floating friction pads. The bicycle disc brake caliper also has a caliper housing with a single piston unit. The housing has a frame mounting member sized to be coupled to a portion of a bicycle frame. The piston unit is movably coupled to the housing between a release position, in which the piston unit is spaced from a disc brake mounted to a wheel of a bicycle, and a braking position, in which the piston unit engages the disc brake of the bicycle wheel. The double disc brake rotor has a support member with first and second disc brake members movably coupled thereto. More specifically, the support member has an outer attachment portion and an inner attachment portion. The inner attachment portion is configured to be coupled to rotate with a hub about a center rotational axis. The first disc member is movably coupled to the outer attachment portions for a first amount of axial movement relative to the support member. The second disc member is movably coupled to the outer attachment portion for a second amount of axial movement relative to the support member. The second amount of axial movement is different from the first amount of axial movement. Preferably, the first amount of axial movement is preferably at least twice the second amount of axial movement.

20 Claims, 11 Drawing Sheets

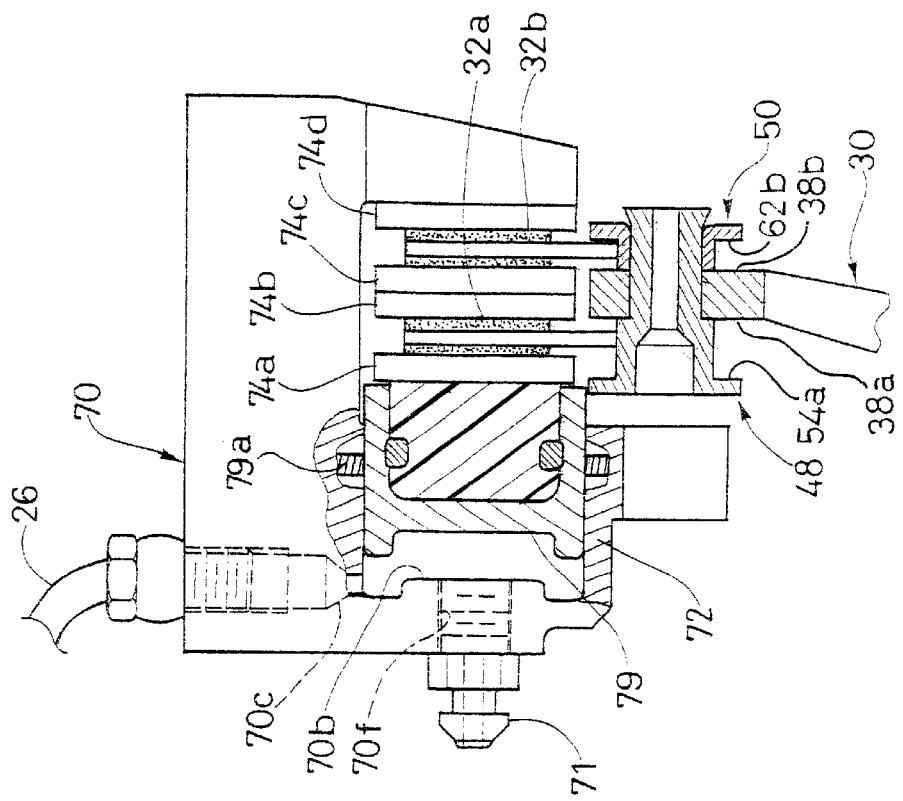
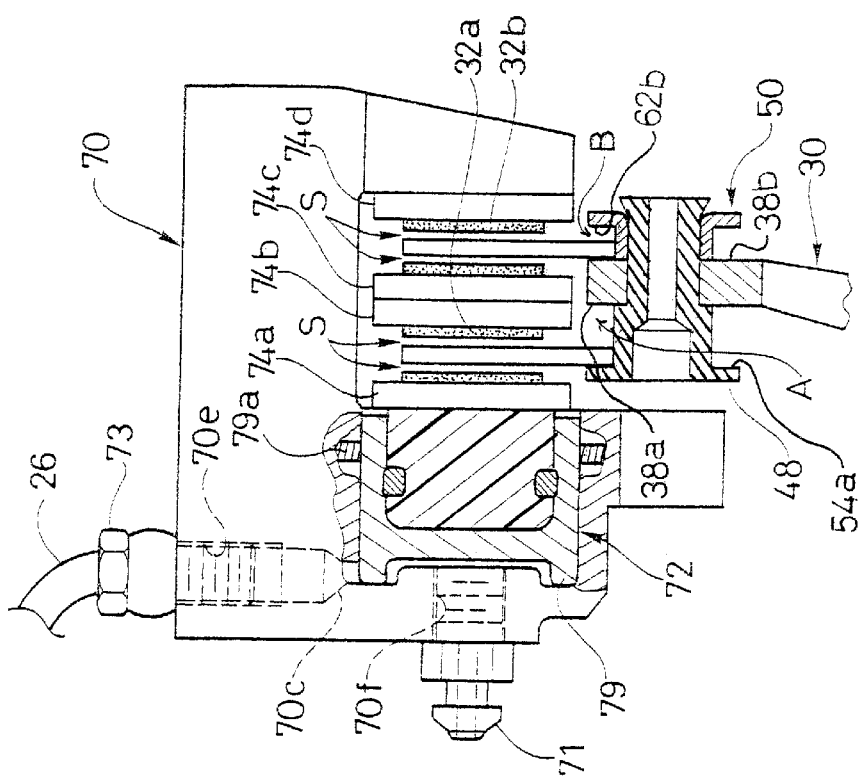
Fig. 5
Fig. 4

BICYCLE DISC BRAKE ASSEMBLY

BACKGROUND OF THE INVENTION

1. Field of the Invention

This invention generally relates to disc brakes for bicycles. More specifically, the present invention relates to a disc brake caliper with a single piston unit that is used with a disc brake rotor having a pair of floating disc members.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. One particular component of the bicycle, which has been extensively redesigned over the past years, is the braking systems of bicycles. In particular, the braking power of the braking systems is constantly being increased.

There are several types of bicycle brake devices, which are currently available on the market. Examples of some types of common bicycle brake devices include rim brakes, caliper brakes and disc brakes. If a rider wants a very high performance brake system, then the rider typically wants a disc brake system. Disc brake systems provide a substantial braking power in relationship to the amount of braking force applied to the brake lever. Moreover, disc brake systems typically provide a high level of consistency in all types of weather and riding conditions. Of course, riders constantly desire better performance from disc braking systems, i.e., disc brake systems that have more braking power.

Accordingly, brake systems have been developed with two disc rotors. Typically, the double disc brake systems utilize a fixed middle friction member and a pair of end friction members that move towards the middle friction member. However, one drawback to this type of braking system is that it is expensive because it requires a pair of pistons to move the end friction members towards the middle. Moreover, a caliper with a pair of piston units is also substantially heavier than a caliper housing with a single piston unit. Another problem with prior double disc braking systems is that the caliper housing must be correctly aligned with the disc members of the rotor to avoid bending of the disc members.

In view of the above, there exists a need for a disc brake, which overcomes the problems of prior art disc brakes. This invention addresses this need in the prior art as well as other needs, which will become apparent to those skilled in the art from this disclosure.

SUMMARY OF THE INVENTION

One object of the present invention is to provide a bicycle disc brake assembly with a double disc rotor for increased braking power.

Another object of the present invention is to provide a disc brake assembly that is relatively compact and lightweight in relation to the amount of braking power.

Another object of the present invention is to provide a disc brake assembly that is relatively inexpensive to manufacture.

The foregoing objects can be basically attained by providing a disc brake rotor comprising a support member, a first disc brake member and a second disc brake member. The support member has an outer attachment portion and an inner attachment portion configured to be coupled to rotate with a rotating member about a center rotational axis. The first disc brake member is movably coupled to the outer attachment portion for a first amount of axial movement relative to the support member. The second disc brake member is movably coupled to the outer attachment portion for a second amount of axial movement relative to the support member. The second amount of axial movement is different from the first amount of axial movement. The second disc brake member is axially spaced from and arranged substantially parallel to the first disc brake member.

The foregoing objects can be basically attained by providing a disc brake assembly comprising a support member, a first disc brake member, a second disc brake member, a caliper housing, a first end friction member, a second end friction member and a middle friction member. The support member has an outer attachment portion and an inner attachment portion configured to be coupled to rotate with a rotating member about a center rotational axis. The first disc brake member is movably coupled to the outer attachment portion for a first amount of axial movement relative to the support member. The second disc brake member is movably coupled to the outer attachment portion for a second amount of axial movement relative to the support member. The second amount of axial movement is different from the first amount of axial movement. The second disc brake member is axially spaced from and arranged substantially parallel to the first disc brake member. The caliper housing has a piston unit movably coupled thereto between a release position and a braking position for applying a braking force to the first and second disc brake members. The first end friction member is movably coupled to the housing by the piston unit to move between the release position and the braking position. The second end friction member is coupled to the housing and arranged substantially parallel to the first end friction member. The middle friction member is movably coupled to the housing between the first and second end friction members.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 4 is a partial front elevational view of the disc brake caliper of the bicycle disc brake assembly of the present invention illustrated in FIGS. 1 and 2, with portions of the caliper broken away to show the piston unit in the retracted position;

FIG. 5 is a partial front elevational view the disc brake caliper of the bicycle disc brake assembly of the present invention illustrated in FIGS. 1 and 2, with portions of the caliper broken away to show the piston unit in the braking position;

DETAILED DESCRIPTION OF THE PREFERRED EMBODIMENTS

Figure 1:
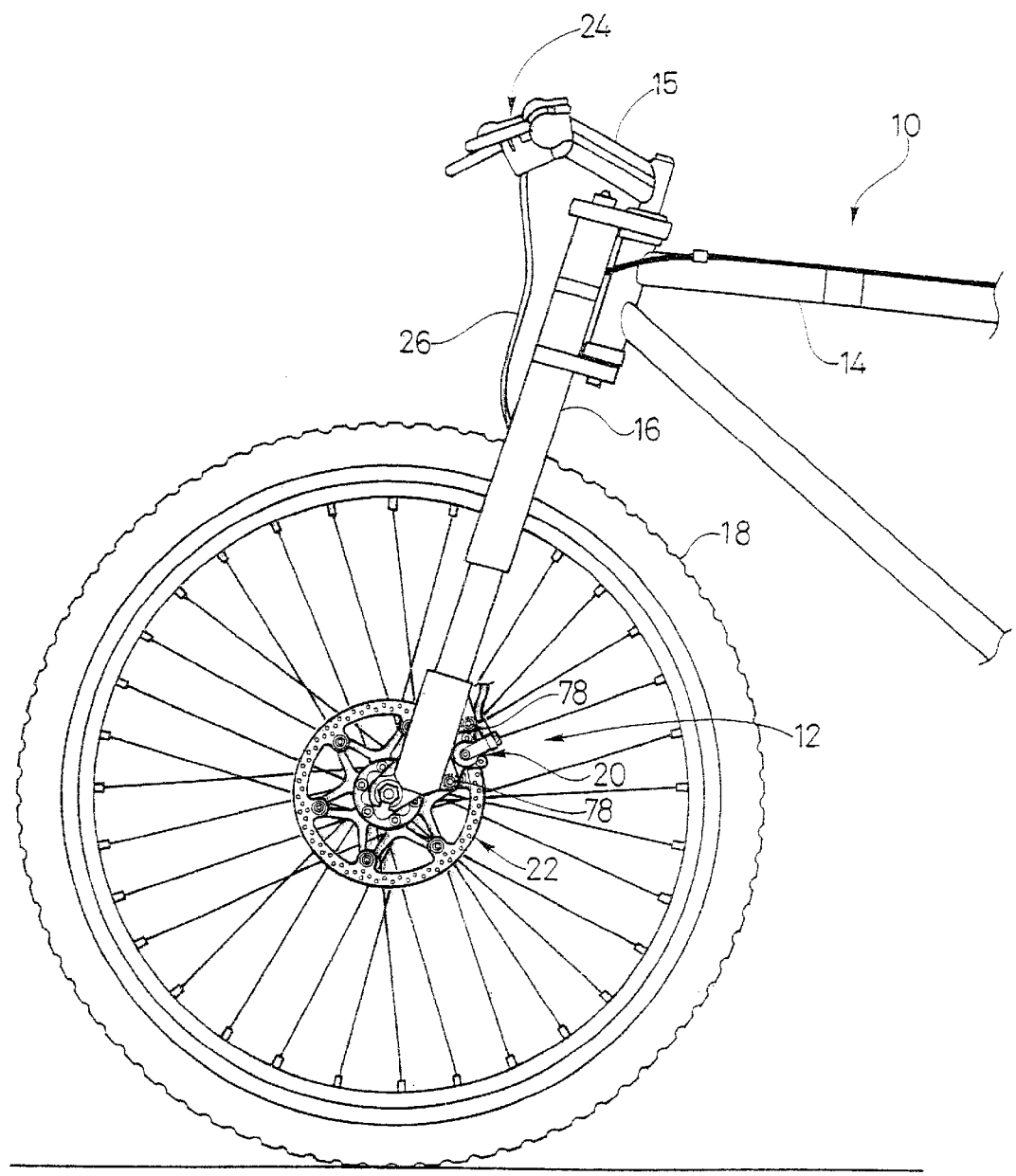
FIG. 1 is a side elevational view of a front portion of a bicycle with a bicycle disc brake assembly coupled thereto in accordance with one embodiment of the present invention.
Figure 2:
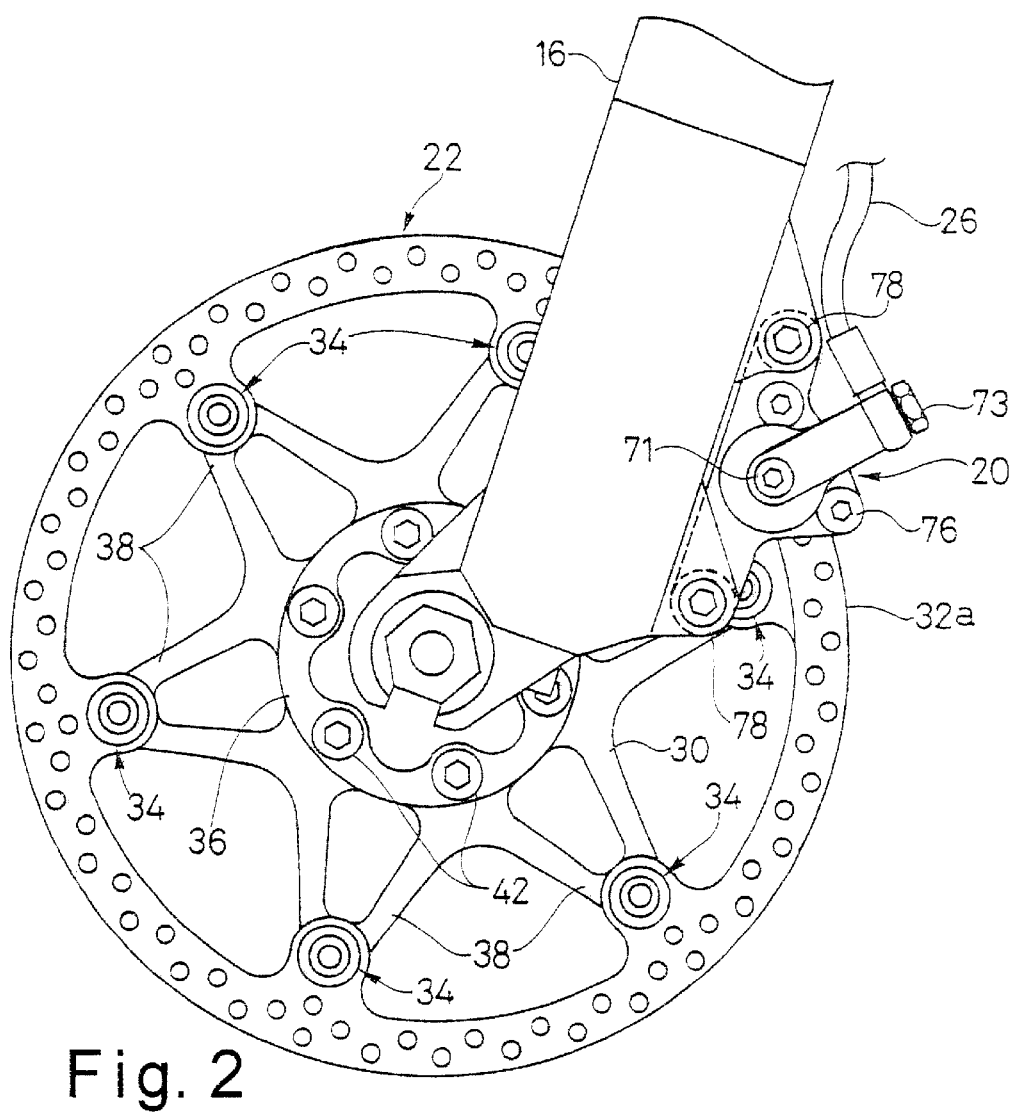
FIG. 2 is an enlarged, partial side elevational view of the bicycle disc brake assembly coupled to the front fork of the bicycle in accordance with the embodiment of the present invention illustrated in FIG. 1.

Referring initially to FIGS. 1 and 2, a front portion of a bicycle 10 is illustrated with a disc brake assembly 12 coupled thereto in accordance with one embodiment of the present invention. Bicycles such as bicycle 10 are well known in the art, and thus, bicycle 10 and its various components will not be discussed or illustrated in detail herein. It will be apparent to those skilled in the art that bicycle 10 can be any type of bicycle, e.g., mountain bike, a hybrid bike or a road bike. Bicycle 10 is a conventional bicycle, which basically includes a bicycle frame 14 with a handle bar 15, front and rear forks 16 (only front fork shown), front and rear wheels 18 (only front wheel shown) and a drive train (not shown).

While only the front portion of bicycle 10 is illustrated as having a disc brake assembly 12, it will be apparent to those skilled in the art from this disclosure that a second or rear disc brake assembly 12 can be utilized for stopping the rear wheel of bicycle 10. It will also be apparent to those skilled in the art from this disclosure that various changes and modifications can be made from the embodiments disclosed herein without departing from the scope of the invention as defined in the appended claims.

Disc brake assembly 12 basically includes a disc brake caliper 20, a disc brake rotor 22 and a brake operating mechanism 24. Disc brake caliper 20 is mounted on front fork 16 of bicycle 12 adjacent disc brake rotor 22. Disc brake rotor 22 is fixedly coupled to front wheel 18 for rotation therewith. Brake operating mechanism 24 is preferably fixedly mounted on handle bar 15 adjacent the hand portion of handle bar 15. Brake operating mechanism 24 is operatively coupled to disc brake caliper 20 by a brake fluid hose 26. Accordingly, brake operating mechanism 24 is operated to move disc brake caliper 20 between a release position and a braking position. In particular, disc brake caliper 20 moves from a release position in which bicycle wheel 18 and disc brake rotor 22 are free to rotate, and a braking position in which disc brake caliper 20 applies a braking force against disc brake rotor 22 to stop rotation of bicycle wheel 18 and disc brake rotor 22.

Turning first to FIGS. 9–16, the disc brake rotor 22 basically includes a disc support member 30, a pair of disc brake members 32a and 32b coupled to the outer periphery of disc support member 30 by six support pins 34. Accordingly, disc brake rotor 22 has twice the braking surface area as a single disc brake of the same size. This arrangement results in disc brake rotor 22 having twice the stopping power of a conventional disc brake of similar size.

Disc support member 30 has a central or inner attachment portion 36 and six attachment arms 38 that form an outer attachment portion. Preferably, the disc support member 30 is constructed as a one-piece, unitary member from a rigid material, such as steel, titanium or aluminum. The inner attachment portion 36 has six attachment holes 40 that receive bolts 42 for securing the disc support member 30 to the hub of the wheel 18. Alternatively, the inner attachment portion 36 can be provided with splines for being fixedly coupled to the hub of bicycle wheel 18. In any event, the disc support member 30 rotates with the wheel 18.

The attachment arms 38 of the disc support member 30 are each provided with a mounting hole 43 that receives one of the support pins 34 therein for coupling the disc brake members 32a and 32b thereto in a floating manner. In other words, the disc brake members 32a and 32b are coupled to disc support member 30 to allow movement of the disc brake members 32a and 32b in an axial direction on support pins 34. Preferably, the amount of axial movement of the disc brake member 32a is approximately 3.10 millimeters±0.1 millimeter, while the amount of axial movement of the disc brake member 32b is preferably approximately 1.00 millimeters±0.1 millimeter.

Figure 12:
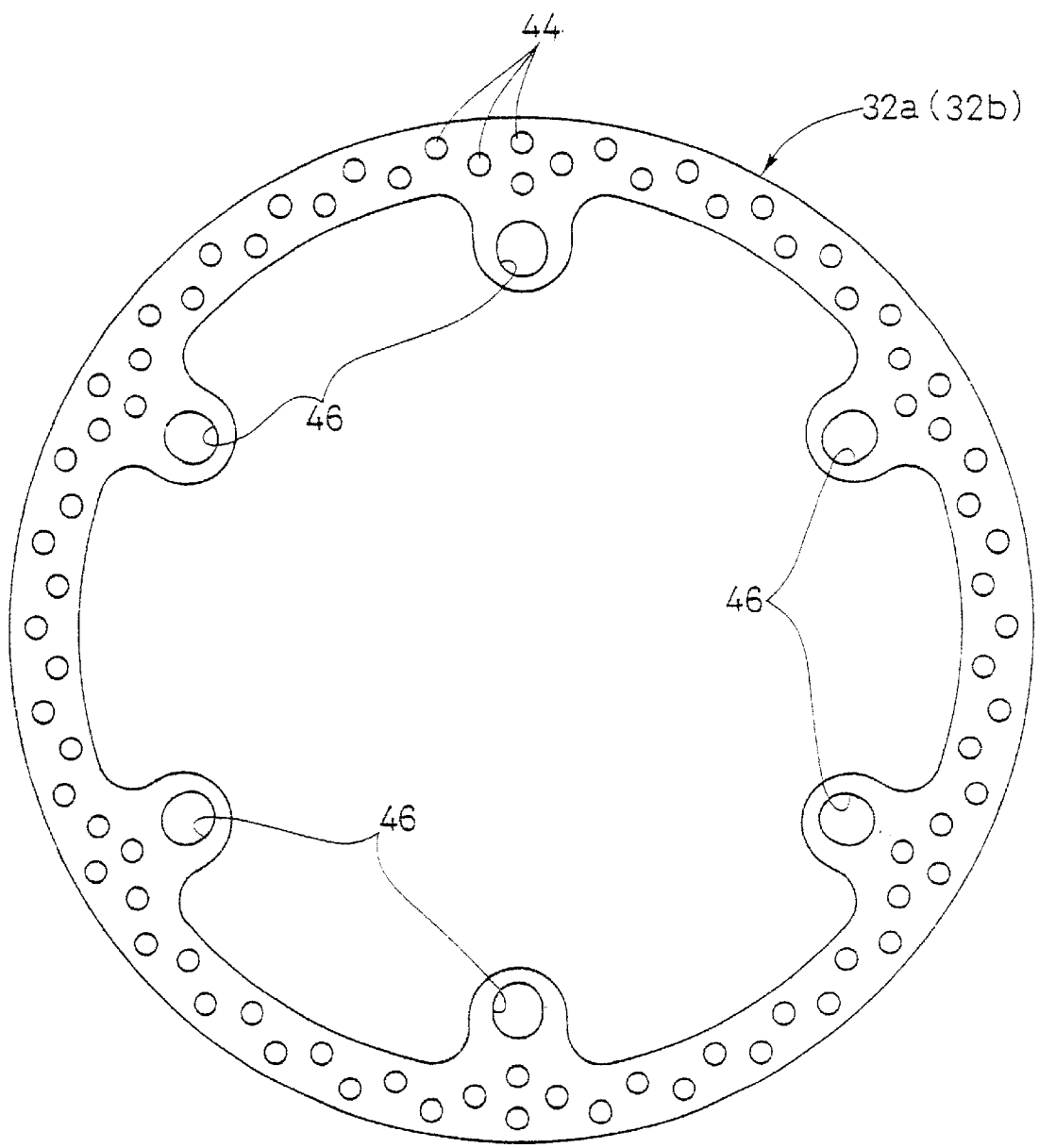
FIG. 12 is a side elevational view of one of the disc brake rotors for the disc brake assembly illustrated in FIGS. 1 and 2.
Figure 13:
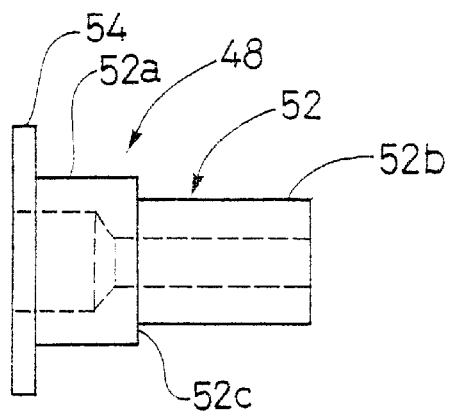
FIG. 13 is an enlarged, side elevational view of the float pin or boss of the bicycle disc brake rotor for the bicycle disc brake assembly illustrated in FIGS. 1, 2 and 8–10.
Figure 15:
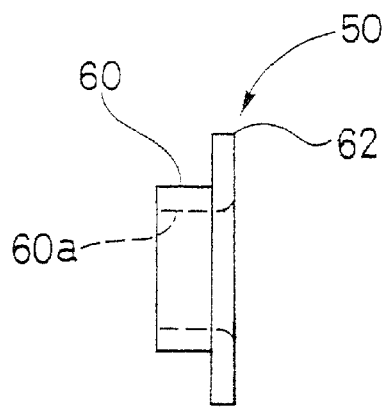
FIG. 15 is a side elevational view of the float washer of the bicycle disc brake rotor for the disc brake assembly illustrated in FIGS. 1, 2 and 8–10.
Figure 14:
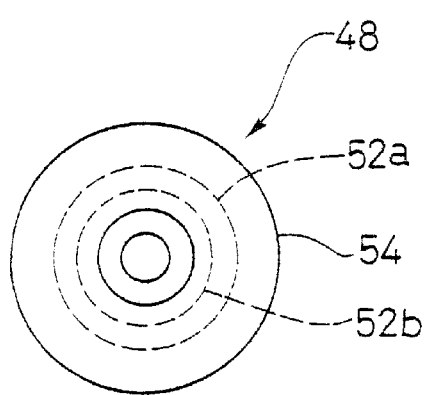
FIG. 14 is an end elevational view of the float pin or boss the bicycle disc brake rotor of the bicycle disc brake assembly illustrated in FIGS. 1, 2, 8–10 and 13.
Figure 16:
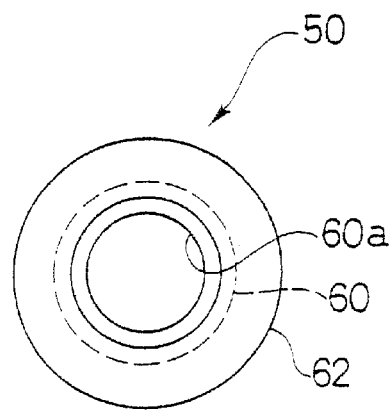
FIG. 16 is an end elevational view of the float washer of the bicycle disc brake rotor of the disc brake assembly of the present invention illustrated in FIGS. 1, 2, 8–10 and 15.

As best seen in FIG. 12, the disc brake members 32a and 32b are preferably ring-shaped members with a plurality of vent holes 44 and six connecting holes 46 for receiving support pins 34. The disc brake members 32a and 32b are preferably identical in configuration and constructed of a rigid material such as those known in the industry to be used for rotors. Disc brake members 32a and 32b are positioned on opposite sides of the disc support member 30 such that the inner facing surfaces of the disc brake members 32a and 32b are spaced axially from the disc support member 30. The disc brake member 32a is movably coupled to the disc support member 30 by the support pins 34 for axial movement relative to the support member 30. The disc brake member 32b is also movably coupled to the disc support member 30 by the support pins 34 for axial movement relative to the support member 30. Preferably, the disc brake member 32a can move axially at least approximately three times that of the disc brake member 32b.

As seen in FIGS. 13–16, each of the support pins 34 is constructed of a float boss 48 and a float washer 50 that are fixedly coupled together for supporting the disc brake members 32a and 32b thereon. More specifically, the disc brake member 32a is supported for axial movement on the float bosses 48, and the disc brake member 32b is supported for axial movement on the float washers 50.

The float bosses 48 are tubular pins with a tubular shaft portion 52 and an annular stop flange 54 formed at one end of the shaft portion 52. Thus, the stop flanges 54 form a first stop member with a first stop surface 54a. The float bosses 48 are preferably constructed of a rigid metallic material. The shaft portion 52 is step shaped with a first cylindrical portion 52a, a second cylindrical portion 52b and an abutment surface 52c formed between the first and second cylindrical portions 52a and 52b. The first cylindrical portion 52a is located adjacent the annular stop flange 54 and has a larger diameter than the second cylindrical portion 52b. The first cylindrical portions 52a of the float bosses 48 are sized to be received in the connecting holes 46 of the disc brake member 32a. The second cylindrical portions 52b of the float bosses 48 are sized to be received in the mounting holes 43 of the attachment arms 38. The attachment arms 38 form a second stop member with a second stop surface 38a and a third stop surface 38b. The second stop surface 38a is axially spaced from the first stop surface 54a and faces the first stop surface 54a. The third stop surface 38b faces in an opposite direction from the second stop surface 38a. Accordingly, the disc brake member 32a can move axially between the stop flanges 54 and the attachment arms 38. When the disc brake member 32a is against the stop flanges 54, an axial space A is defined between the disc brake member 32a and the attachment arms 38.

The float washers 50 are tubular pins with a tubular shaft portion 60 and an annular stop flange 62 formed at one end of the shaft portion 60. Thus, the stop flanges 62 form a third stop member with a fourth stop surface 62b. The fourth stop surface 62b is axially spaced from the third stop surface 38b and faces the third stop surface 38b. The float washers 50 are preferably constructed of a rigid metallic material. The tubular shaft portions 60 of the float washers 50 are mounted on the second cylindrical portions 52b of the float bosses 48 with the attachment arms 38 of the disc support member 30 located therebetween. Specifically, the end of the shaft portion 52 of each float boss 48 is deformed to retain one of the float washers 50 thereon. The shaft portions 60 are cylindrical with an inner bore 60a having a diameter that is substantially equal or slightly larger than the outer diameter of the second cylindrical portion 52b. The shaft portions 60 each have an outer diameter that is equal to the diameter of the first cylindrical portions 52a of the float bosses 48. Accordingly, the shaft portions 60 are sized to be received in the connecting holes 46 of the disc brake member 32b and on the second cylindrical portions 52b. The disc brake member 32b can move axially between the stop flanges 62 and the attachment arms 38. When the disc brake member 32b is against the attachment arms 38, an axial space B is defined between the disc brake member 32b and the stop flanges 62. The axial space A is preferably at least approximately three times the axial space B.

Referring again to FIGS. 4–8, disc brake caliper 20 will now be described in more detail. Disc brake caliper 20 is fixedly coupled to fork 16 adjacent to disc brake rotor 22 for applying a clamping force to stop the rotation of bicycle wheel 18 and disc brake rotor 22. Disc brake caliper 20 basically includes housing 70, a piston unit 72 and four friction members or pads 74a, 74b, 74c and 74d that are mounted to the housing 70 by a pair of bolts 76. Disc brake caliper 20 is a single piston caliper that basically operates in the same manner as a conventional disc brake caliper, except that floating friction members 74b and 74c have been added for increased stopping power. Therefore, the conventional aspects of disc brake caliper 20 will not be discussed or illustrated in detail herein.

Figure 7:
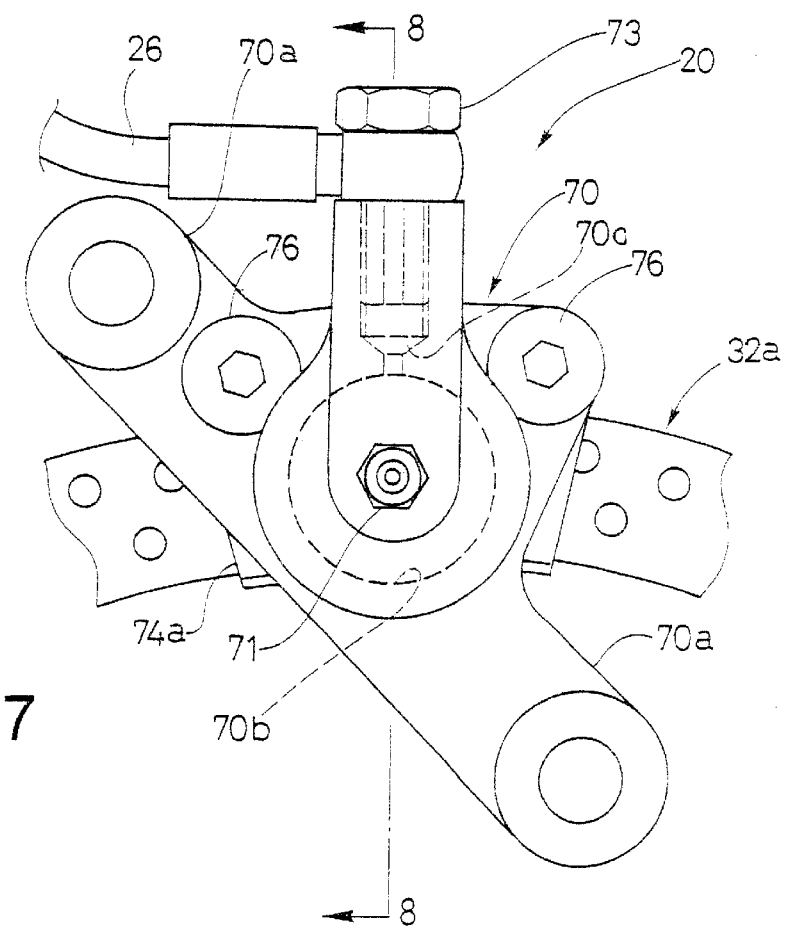
FIG. 7 is an enlarged, side elevational view of the disc brake caliper and a portion of the disc brake rotor of the bicycle disc brake assembly illustrated in FIGS. 1 and 2.

As seen in FIGS. 1 and 7, the housing 70 has a pair of outwardly extending flanges 70a that form a mounting member for bolting disc brake caliper 20 to fork 16 of bicycle 10 by bolts 78. The housing 70 also has a cylindrical piston recess 70b with the piston unit 72 slidably retained therein and an internal fluid actuating passage 70c that is fluidly coupled to the brake operating mechanism 24 by the brake fluid hose 26. Thus, brake fluid enters the housing 70 through the internal fluid actuating passage 70c and then into the piston recess 70b for pressurizing the piston recess 70b. This pressure in the piston recess 70b causes the piston unit 72 to slide outwardly from the piston recess 70b. Accordingly, the first friction member 74a that is engaged by the piston unit 72 and is moved against the first disc brake member 32a. This movement of the first disc brake member 32a causes the first disc brake member 32a to contact and move the floating friction members 74b and 74c. Floating friction member 74c then contacts and moves the second disc brake member 32b against the fourth friction member 74d.

The housing 70 has a first threaded opening 70e, which is in fluid communication with internal fluid actuating passage 70c. Opening 70e is designed for attaching a hydraulic line or brake fluid hose 26 thereto via connector 73. A second threaded opening 70f is also provided for threadedly receiving a bleed nipple 71. Second threaded opening 70f is in fluid communication with the piston recess 70b such that excess air can be removed from the actuating system. Internal fluid actuating passage 70c interconnects piston recess 70b together for receiving actuating fluid or hydraulic fluid to activate piston unit 72.

Figure 6:
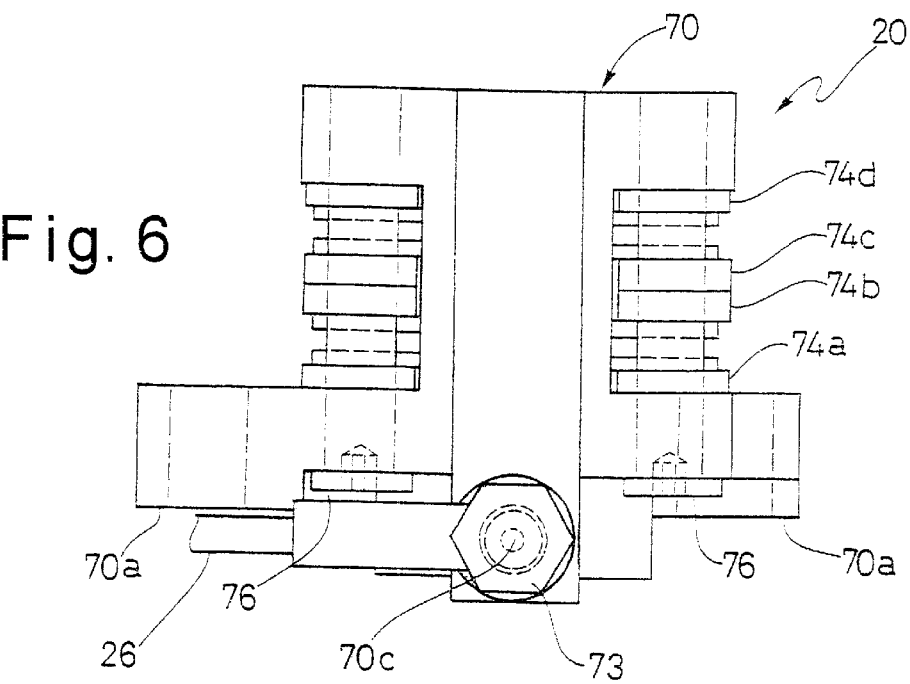
FIG. 6 is an enlarged, top plan view of the disc brake caliper of the bicycle disc brake assembly illustrated in FIGS. 1 and 2.
Figure 8:
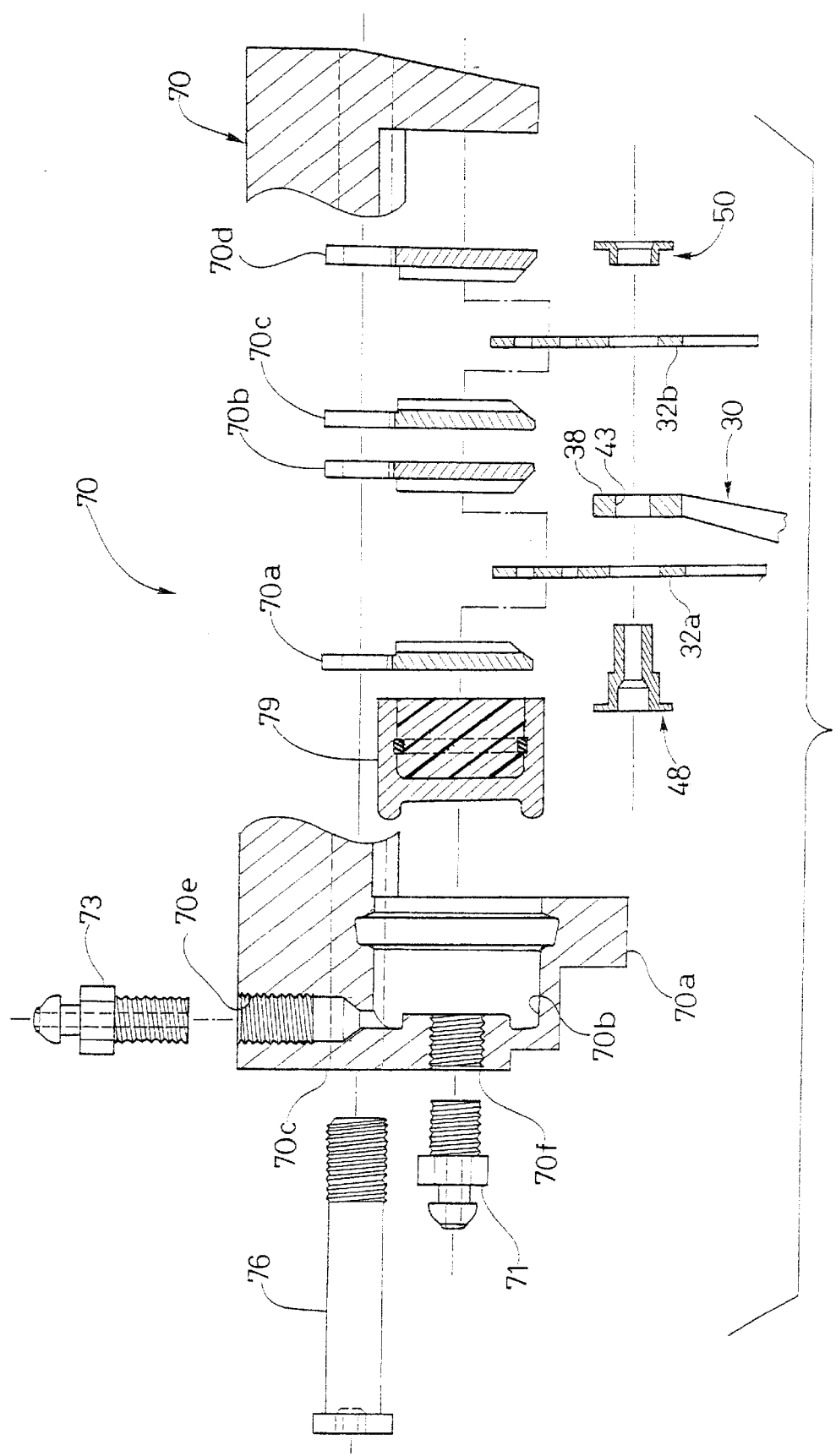
FIG. 8 is an exploded cross-sectional view of the disc brake caliper and a portion of the disc brake rotor of the bicycle disc brake assembly illustrated in FIGS. 1, 2 and 7, as seen along section line 8—8 in FIG. 7.
Figure 9:
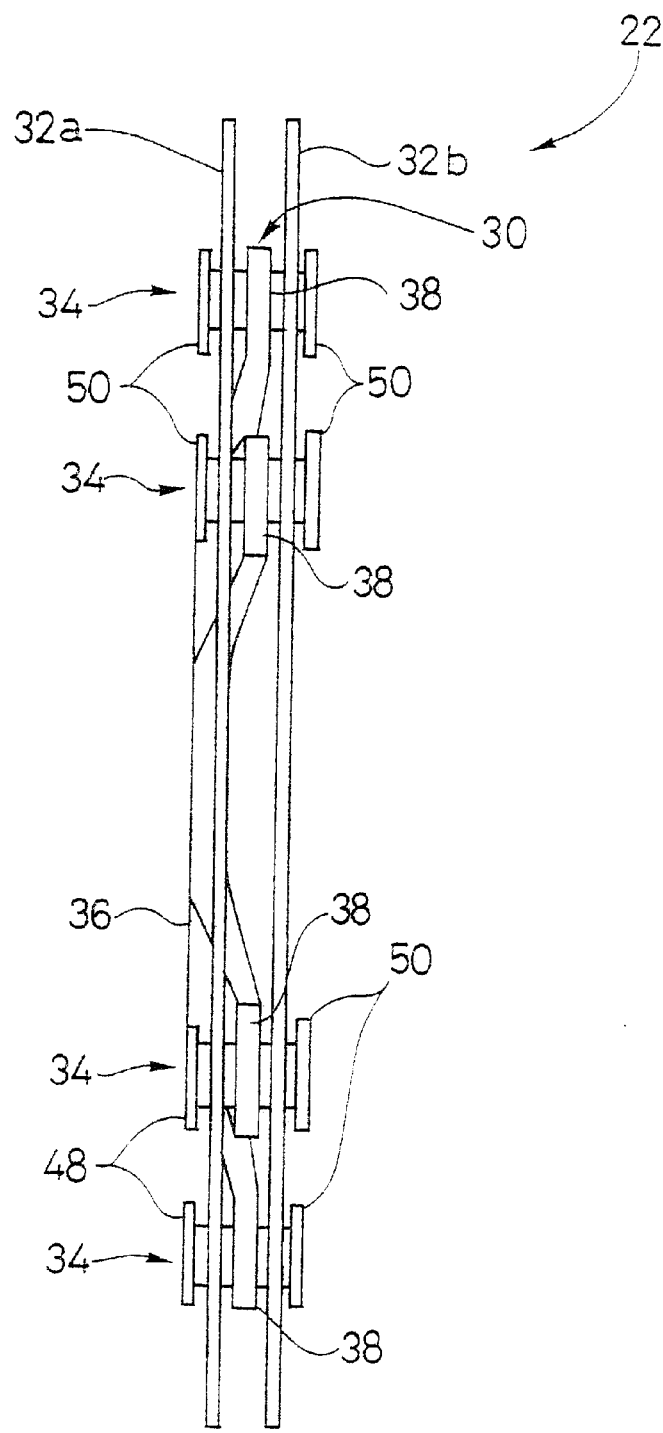
FIG. 9 is an edge elevational view of the brake disc rotor of the present invention illustrated in FIGS. 1 and 2.
Figure 10:
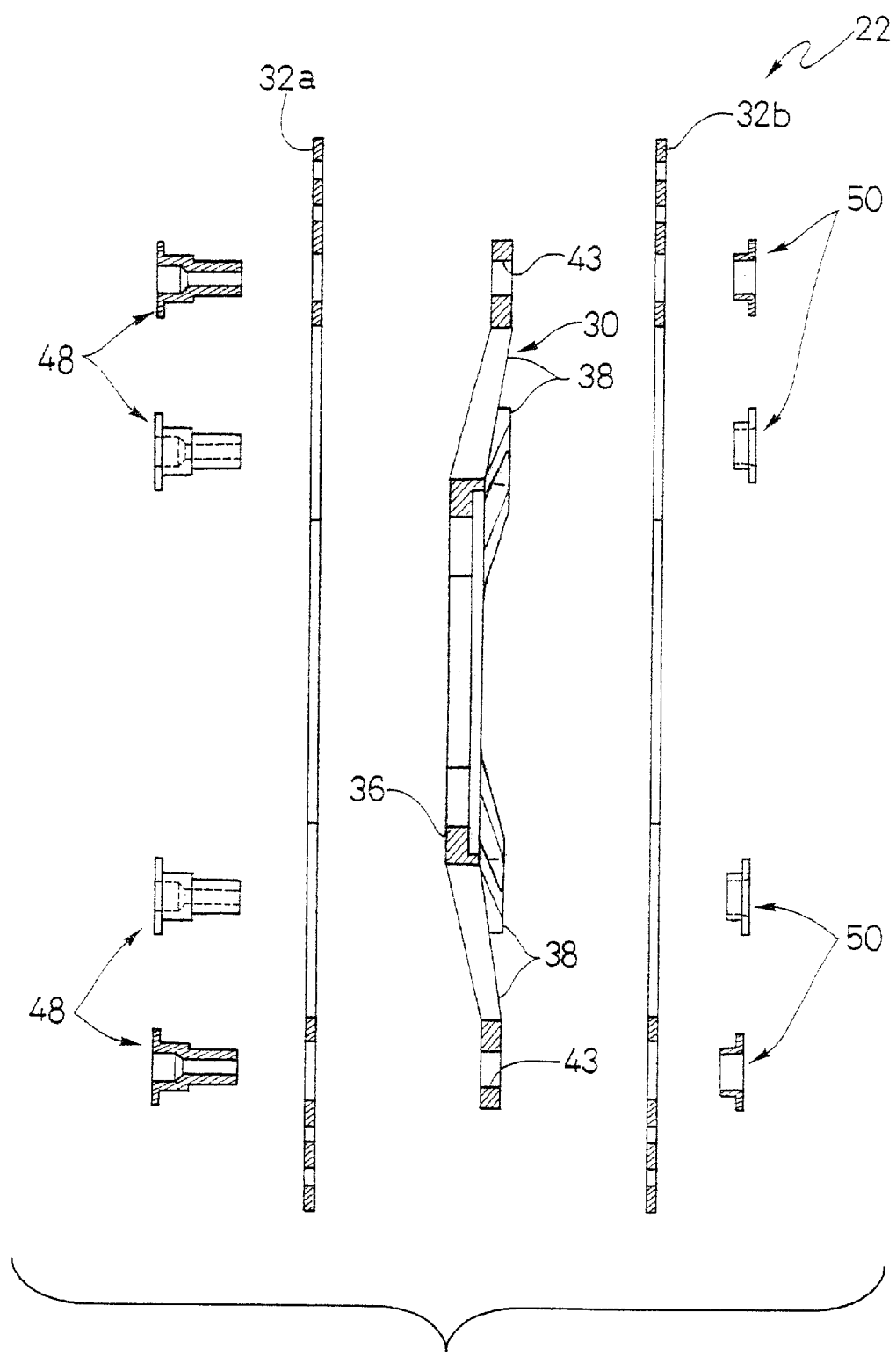
FIG. 10 is an exploded cross-sectional view of the bicycle disc brake rotor of the disc brake assembly of the present invention illustrated in FIGS. 2 and 9.
Figure 11:
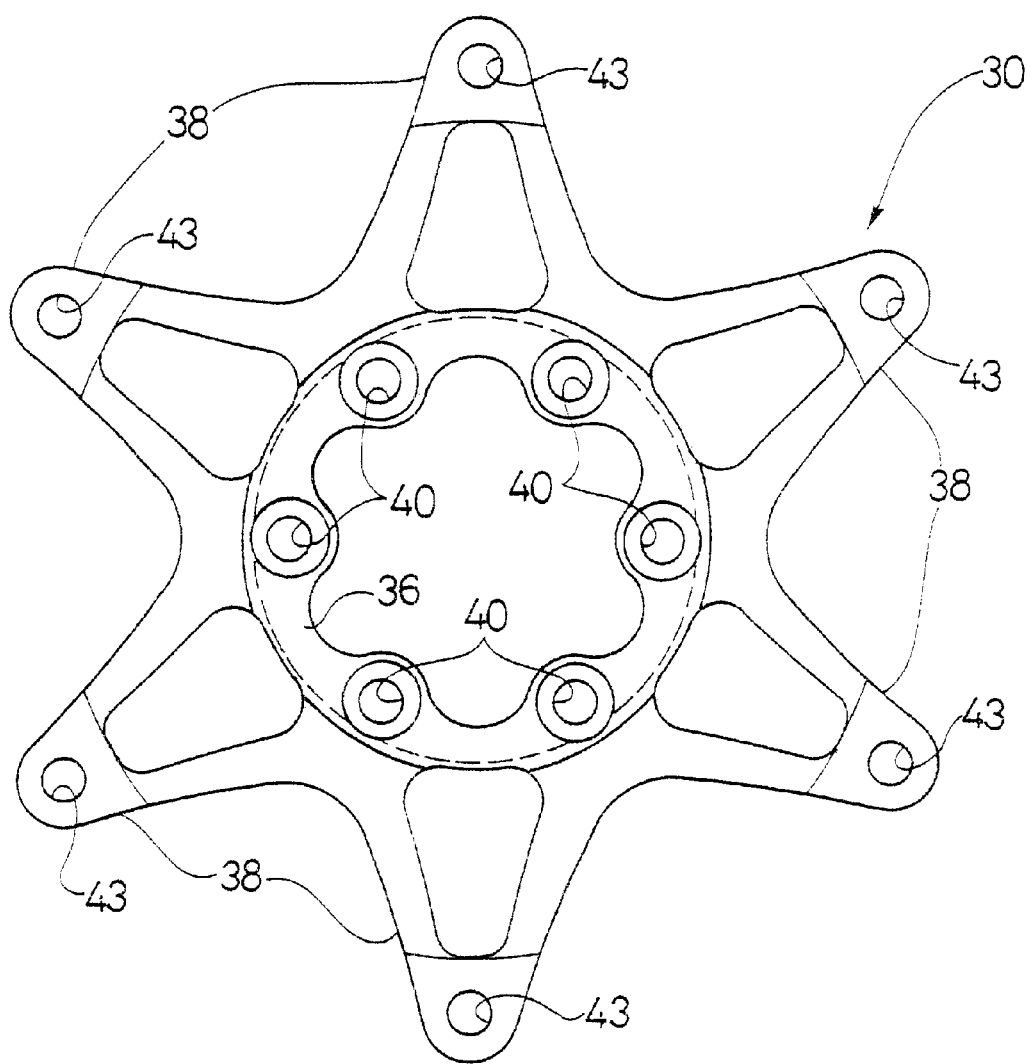
FIG. 11 is a side elevational view of the disc support member for the bicycle disc brake assembly of the present invention illustrated in FIGS. 1 and 2.
Figure 17:
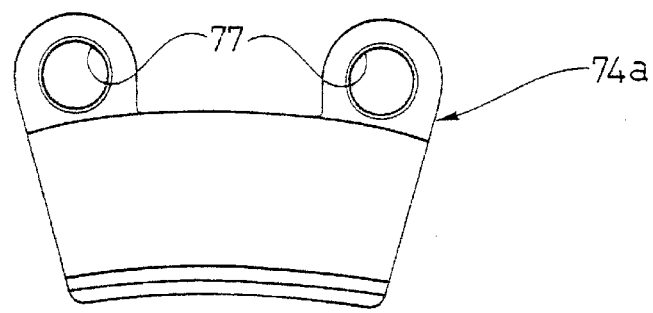
FIG. 17 is a side elevational view of one of the friction members of the caliper for the disc brake assembly of the present invention illustrated in FIGS. 1, 2 and 8.

As seen in FIGS. 6 and 8, the pair of bolts 76 movably couple all the friction members 74a, 74b, 74c and 74d to the housing 70. Preferably, the friction members 74a, 74b, 74c and 74d are all identical in construction. In other words, the friction members 74b, 74c and 74d are identical to the friction member 74a shown in FIG. 17. Each friction member 74a–74d has a pair of holes 77 for receiving the bolts 76 therein. Thus, friction members 74a–74d are slidably mounted on the bolts 76. The piston unit 72 can move friction members 74a, 74b and 74c towards friction member 74d to frictionally engage disc brake members 32a and 32b. The middle friction members 74b and 74c are allowed to float between friction members 74a and 74d. It will be apparent to those skilled in the art from this disclosure that the present invention can be used in braking systems in which one of the end friction members is fixed to the housing, while the piston unit pushes the other end friction member and the middle friction members towards the fixed friction member.

As seen in FIGS. 4–8, piston unit 72 preferably includes a single piston 79 and a ring 79a located between the housing 70 and piston 79. The piston 79 engages the friction member 74a to move it against the first disc member 32a. Piston 79 is slidably received in piston recess 70b for movement between a release position and a braking position. In other words, as piston 79 move from a release position to a braking position, friction pads 74a, 74b, 74c and 74d also move from a release position to a braking position. In the braking position, friction pads 74a, 74b, 74c and 74d frictionally engage disc brake members 32a and 32b to stop the rotation of assembly disc brake rotor 22 and wheel 18.

In the release position, friction pads 74a, 74b, 74c and 74d are spaced from disc brake members 32a and 32b by predetermined distances S to allow disc brake rotor 22 to freely rotate therebetween. Therefore, wheel 18 can also rotate freely.

Piston 79 and friction pads 74a, 74b, 74c and 74d are moved from their release positions to their braking positions by actuating or hydraulic fluid applying a force to piston 79. More specifically, as brake operating mechanism 24 is actuated, actuating fluid is pressurized so as to force piston 79 and the friction member 74a toward friction member 74d, and thus, squeezing disc brake members 32a and 32b and the friction members 74b and 74c therebetween.

Figure 3:
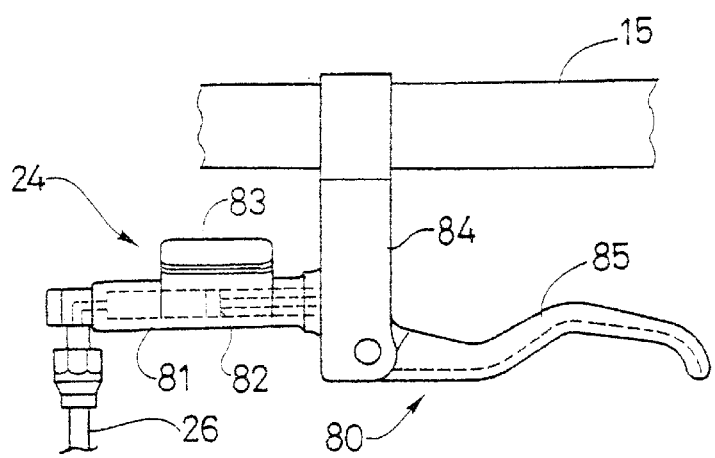
FIG. 3 is a top plan view of the brake operating mechanism mounted on the handle bar of the bicycle in accordance with the embodiment of the present invention illustrated in FIG. 1.

Referring now to FIGS. 1 and 3, brake operating mechanism 24 will now be described in more detail. Basically, brake operating mechanism 24 is designed to actuate the disc brake caliper 20 to apply a forcible gripping action on disc brake rotor 22 to stop rotation of front wheel 18. Brake operating mechanism 24 basically includes a brake lever 80, a hydraulic or master cylinder 81, a hydraulic or master piston 82, and an actuation fluid reservoir 83.

Preferably, brake operating mechanism 24 is a single unit which is mounted on handlebar 15. In particular, brake lever 80 includes a mounting portion 84 and a lever portion 85. Mounting portion 84 is designed to be clamped onto handle bar 15 in a conventional manner. Mounting portion 84 is integrally formed with master cylinder 81 such that master cylinder 81, a master piston 82 and actuation fluid reservoir 83 are all supported on mounting portion 84 of brake lever 80. Lever portion 85 is pivotally coupled to mounting portion 84 for movement between a release position and a braking position. Normally, lever portion 85 is maintained in a release position in a conventional manner, e.g. a return spring (not shown).

Master piston 82 is movably mounted within master cylinder 81 in a conventional manner. More specifically, actuation fluid reservoir 83 is mounted on master cylinder 81 and in fluid communication with the interior bore of master cylinder 81 for supplying actuation fluid thereto. Master piston 82 is connected at one end to lever portion 85 for axially moving master piston 82 within master cylinder 81. Accordingly, actuation of lever portion 85 causes master piston 82 to move axially within master cylinder 81. This movement of master piston 82 within master cylinder 81 directs fluid pressure through a hydraulic line or brake fluid hose 26, which is coupled to disc brake caliper 20. Thus, the pressurized actuation fluid causes the piston 79 and friction members 74a, 74b, 74c and 74d to engage disc brake members 32a and 32b to stop rotation of wheel 18.

SECOND EMBODIMENT

Figure 18:
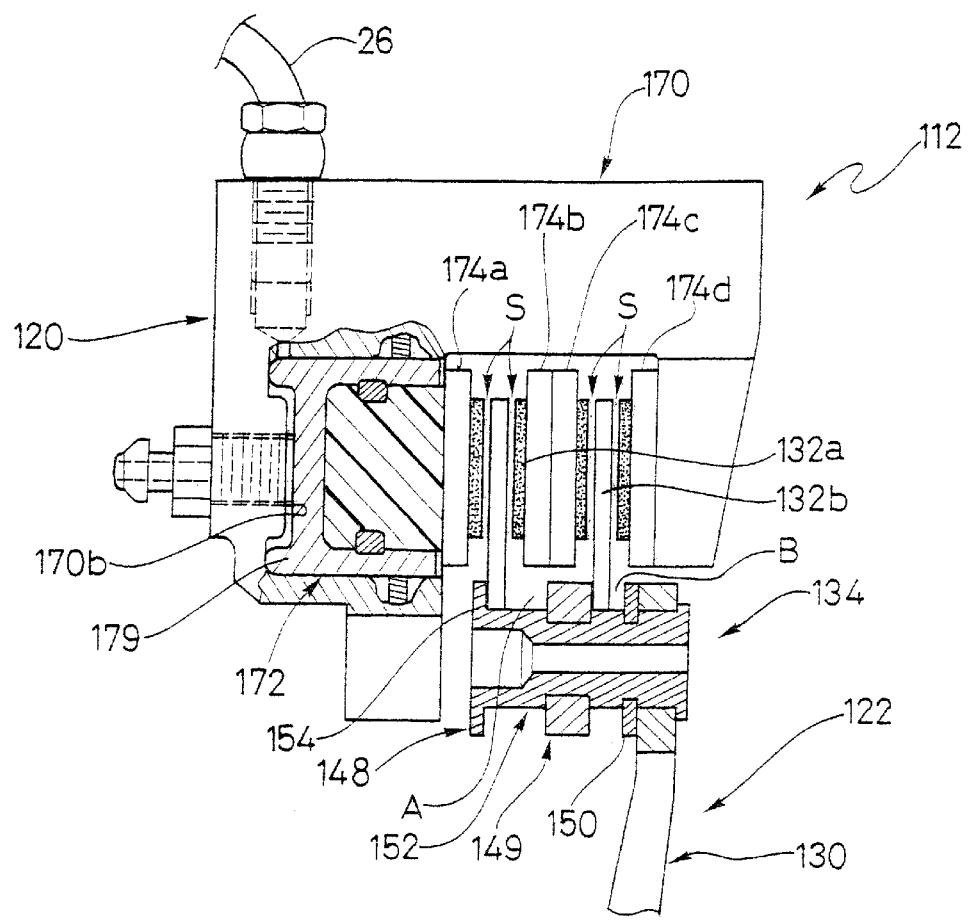
FIG. 18 is a partial front elevational view of a disc brake caliper and a portion of a disc brake rotor with portions broken away in accordance with a second embodiment of the present invention.

Referring now to FIG. 18, a disc brake assembly 112 is illustrated in accordance with a second embodiment of the present invention. The disc brake assembly 112 basically includes a disc brake caliper 120 and a disc brake rotor 122. The disc brake assembly 112 of the second embodiment is similar to the first embodiment, and thus, parts that serve the same function as those in the first embodiment have 100 added to the reference number. Disc brake assembly 112 is designed to be mounted on bicycle 10 of the first embodiment in substantially the same manner as the disc brake assembly 12 of the first embodiment. Moreover, disc brake caliper 120 is coupled to the brake operating mechanism 24 (FIG. 3) via hydraulic line or hose 26.

The disc brake caliper 120 is identical to disc brake caliper 20 discussed above, and thus, will not be discussed or illustrated in detail herein. Disc brake caliper 120 basically includes housing 170, a piston unit 172 and four friction members or pads 174a, 174b, 174c and 174d that are mounted to the housing 170. Friction members or pads 174a, 174b, 174c and 174d are spaced apart by a distance S when the piston 179 is in the retracted position as seen in FIG. 18. Disc brake caliper 120 is a single piston caliper that basically operates in the same manner as a conventional disc brake caliper, except that floating friction members 174b and 174c have been added for increased stopping power. Brake fluid enters the housing 170 from hydraulic line or hose 26 and then goes through an internal fluid actuating passage into the piston recess 170b for pressurizing the piston recess 170b and thus moving piston 179.

The disc brake rotor 122 is substantially identical to the disc brake rotor 22 of the first embodiment, except that the support pins 34 of the first embodiment have been replaced with support pins 134 in the second embodiment. The disc brake rotor 122 basically includes a disc support member 130, a pair of disc brake members 132a and 132b coupled to the outer periphery of the disc support member 130 by support pins 134. Accordingly, only support pins 134 will be discussed or illustrated in detail herein when referring to the brake disc rotor 122. Moreover, it will be apparent to those skilled in the art from this disclosure that the description of the disc brake caliper 20 and the disc brake rotor 22 of the first embodiment applies to the features of the disc brake caliper 120 and the disc brake rotor 122 that are similar to those features of the brake disc caliper 20 and brake disc rotor 22.

Support pin 134 basically includes a float boss 148 and a pair of snap rings 149 and 150 that are secured to float boss 148. Specifically, the float boss 148 has a cylindrical shaft portion 152 with a pair of annular recesses that receives snap washers 149 and 150. The snap flange 154 and the snap washer 149 define a space for receiving first disc brake member 132a therebetween. In other words, brake disc member 132a can move axially between the stop flange 154 and the snap washer 149. Similarly, the brake disc member 132b can move axially between the snap rings 149 and 150. The space A defined between the first brake disc member 132a and the snap ring 149 is preferably three times the distance of the space B defined between brake disc member 132b and snap ring 150.

Similar to the first embodiment, piston 179 is moved axially by fluid pressure in the piston recess 170b, which in turn moves friction members 174a, 174b and 174c and disc brake members 132a and 132b towards friction member 174b.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A disc brake rotor comprising:
   a support member having an outer attachment portion and an inner attachment portion configured to be coupled to rotate with a rotating member about a center rotational axis;
   a first disc brake member movably coupled to said outer attachment portion for a first amount of axial movement relative to said support member; and a second disc brake member movably coupled to said outer attachment portion for a second amount of axial movement relative to said support member with said second amount of axial movement being different from said first amount of axial movement, said second disc brake member being axially spaced from and arranged substantially parallel to said first disc brake member, said outer attachment portion of said support member including first, second, third and fourth stop surfaces that are axially spaced apart to limit axial movement of said first and second disc brake members, said first disc brake member being arranged between said first and second stop surfaces to freely move and contact said first and second stop surfaces, said second disc brake member being arranged between said third and fourth stop surfaces to freely move and contact said third and fourth stop surfaces, said first and second stop surfaces facing each other and being axially spaced apart by a first distance, said third and fourth stop surfaces facing each other and being axially spaced a part by a second distance, said first distance being greater than said second distance.

2. A disc brake rotor according to claim 1, wherein said outer attachment portion of said support member includes a plurality of support pins with said first and second disc brake members coupled thereto.

3. A disc brake rotor comprising:

a support member having an outer attachment portion and an inner attachment portion configured to be coupled to rotate with a rotating member about a center rotational axis;

a first disc brake member movably coupled to said outer attachment portion for a first amount of axial movement relative to said support member; and a second disc brake member movably coupled to said outer attachment portion for a second amount of axial movement relative to said support member with said second amount of axial movement being different from said first amount of axial movement, said second disc brake member being axially spaced from and arranged substantially parallel to said first disc brake member, said outer attachment portion of said support member including first, second and third stop members that are being axially spaced apart to limit axial movement of said first and second disc brake members, said first disc brake member being located between said first and second stop members, said second disc brake member being located between said second and third stop members, said first and second stop members being axially spaced apart greater than an axial spacing between said second and third stop members, said first disc brake member being located on a first axial side of said support member, and said second disc brake member being located on a second axial side of said support member that is opposite said first axial side of said support member.

4. A disc brake rotor according to claim 1, wherein said first amount of axial movement is approximately three times said second amount of axial movement.

5. A disc brake rotor according to claim 1, wherein said first and second disc brake members are located on a first axial side of said support member.

6. A disc brake rotor comprising:

a support member having an outer attachment portion and an inner attachment portion configured to be coupled to rotate with a rotating member about a center rotational axis;

a first disc brake member movably coupled to said outer attachment portion for a first amount of axial movement relative to said support member; and a second disc brake member movably coupled to said outer attachment portion for a second amount of axial movement relative to said support member with said second amount of axial movement being different from said first amount of axial movement, said second disc brake member being axially spaced from and arranged substantially parallel to said first disc brake member, said outer attachment portion of said support member including a plurality of support pins with said first and second disc brake members coupled thereto, said first disc brake member being located on a first axial side of said support member, and said second disc brake member being located on a second axial side of said support member that is opposite said first side.

7. A disc brake rotor according to claim 6, wherein each of said support pins has first and second stops formed thereon with said first stops being spaced from said first axial side of said support member by a first distance corresponding to said first amount of axial movement and said second stops being spaced from said second axial side of said support member by a second distance corresponding to said second amount of axial movement.

8. A disc brake rotor comprising:

a support member having an outer attachment portion and an inner attachment portion configured to be coupled to rotate with a rotating member about a center rotational axis;

a first disc brake member movably coupled to said outer attachment portion for a first amount of axial movement relative to said support member; and a second disc brake member movably coupled to said outer attachment portion for a second amount of axial movement relative to said support member with said second amount of axial movement being different from said first amount of axial movement, said second disc brake member being axially spaced from and arranged substantially parallel to said first disc brake member, said outer attachment portion of said support member including a plurality of support pins with said first and second disc brake members coupled thereto, said support pins including float bosses with first stop flanges at first ends and float washers with second stop flanges, said float bosses and said float washers being coupled to said support member.

9. A disc brake rotor according to claim 8, wherein said float bosses and said float washers are located on opposite axial sides of said support member.

10. A disc brake rotor according to claim 9, wherein each of said float washers has an axial bore that receives a portion of a corresponding one of said float bosses.

11. A disc brake assembly comprising:

a support member having an outer attachment portion and an inner attachment portion configured to be coupled to rotate with a rotating member about a center rotational axis;

a first disc brake member movably coupled to said outer attachment portion for a first amount of axial movement relative to said support member;

a second disc brake member movably coupled to said outer attachment portion for a second amount of axial movement relative to said support member with said second amount of axial movement being different from said first amount of axial movement, said second disc brake member being axially spaced from and arranged substantially parallel to said first disc brake member;

a caliper housing with a piston unit movably coupled thereto between a release position and a braking position for applying a braking force to said first and second disc brake members;

a first end friction member coupled to said housing and arranged to be moved by said piston unit between said release position and said braking position;

a second end friction member coupled to said housing and arranged substantially parallel to said first end friction member; and a middle friction member movably coupled to said housing between said first and second end friction members, said outer attachment portion of said support member including first, second, third and fourth stop surfaces that are axially spaced apart to limit axial movement of said first and second disc brake members, said first disc brake member being arranged on said attachment portion between said first and second stop surfaces to freely move and contact said first and second stop surfaces prior to assembly with said caliper housing, said second disc brake member being arranged on said attachment portion between said third and fourth stop surfaces to freely move and contact said third and fourth stop surfaces prior to assembly with said caliper housing, said first and second stop surfaces facing each other and being axially spaced apart by a first distance, said third and fourth stop surfaces facing each other and being axially spaced apart by a second distance, said first distance being greater than said second distance.

12. A disc brake assembly according to claim 11, wherein said outer attachment portion of said support member includes a plurality of support pins with said first and second disc brake members coupled thereto.

13. A disc brake assembly comprising:

a support member having an outer attachment portion and an inner attachment portion configured to be coupled to rotate with a rotating member about a center rotational axis;

a first disc brake member movably coupled to said outer attachment portion for a first amount of axial movement relative to said support member;

a second disc brake member movably coupled to said outer attachment portion for a second amount of axial movement relative to said support member with said second amount of axial movement being different from said first amount of axial movement, said second disc brake member being axially spaced from and arranged substantially parallel to said first disc brake member;

a caliper housing with a piston unit movably coupled thereto between a release position and a braking position for applying a braking force to said first and second disc brake members;

a first end friction member coupled to said housing and arranged t o be moved by said piston unit between said release position and said braking position;

a second end friction member coupled to said housing and arranged substantially parallel to said first end friction member; and a middle friction member movably coupled to said housing between said first and second end friction members, said outer attachment portion of said support member including first, second and third stop members that are being axially spaced apart to limit axial movement of said first and second disc brake members, said first disc brake member being located between said first and second stop members, said second disc brake member being located between said second and third stop members, said first and second stop members being axially spaced apart greater than an axial spacing between said second and third stop members, said first disc brake member being located on a first axial side of said support member, and said second disc brake member being located on a second axial side of said support member that is opposite said first axial side of said support member.

14. A disc brake assembly according to claim 11, wherein said first amount of axial movement is approximately three times said second amount of axial movement.

15. A disc brake assembly according to claim 11, wherein said first and second disc brake members are located on a first axial side of said support member.

16. A disc brake assembly comprising:

a support member having an outer attachment portion and an inner attachment portion configured to be coupled to rotate with a rotating member about a center rotational axis;

a first disc brake member movably coupled to said outer attachment portion for a first amount of axial movement relative to said support member;

a second disc brake member movably coupled to said outer attachment portion for a second amount of axial movement relative to said support member with said second amount of axial movement being different from said first amount of axial movement, said second disc brake member being axially spaced from and arranged substantially parallel to said first disc brake member;

a caliper housing with a piston unit movably coupled thereto between a release position and a braking position for applying a braking force to said first and second disc brake members;

a first end friction member coupled to said housing and arranged to be moved by said piston unit between said release position and said braking position;

a second end friction member coupled to said housing and arranged substantially parallel to said first end friction member; and a middle friction member movably coupled to said housing between said first and second end friction members, said outer attachment portion of said support member including a plurality of support pins with said first and second disc brake members coupled thereto, said first disc brake member being located on a first axial side of said support member, and said second disc brake member being located on a second axial side of said support member that is opposite said first side.

17. A disc brake assembly according to claim 16, wherein each of said support pins has first and second stops formed thereon with said first stops being spaced from said first axial side of said support member by a first distance corresponding to said first amount of axial movement and said second stops being spaced from said second axial side of said support member by a second distance corresponding to said second amount of axial movement.

18. A disc brake assembly comprising:

a support member having an outer attachment portion and an inner attachment portion configured to be coupled to rotate with a rotating member about a center rotational axis;

a first disc brake member movably coupled to said outer attachment portion for a first amount of axial movement relative to said support member;

a second disc brake member movably coupled to said outer attachment portion for a second amount of axial movement relative to said support member with said second amount of axial movement being different from said first amount of axial movement, said second disc brake member being axially spaced from and arranged substantially parallel to said first disc brake member;

a caliper housing with a piston unit movably coupled thereto between a release position and a braking position for applying a braking force to said first and second disc brake members;

a first end friction member coupled to said housing and arranged to be moved by said piston unit between said release position and said braking position;

a second end friction member coupled to said housing and arranged substantially parallel to said first end friction member; and a middle friction member movably coupled to said housing between said first and second end friction members, said outer attachment portion of said support member including a plurality of support pins with said first and second disc brake members coupled thereto, said support pins including float bosses with first stop flanges at first ends and float washers with second stop flanges, said float bosses and said float washers being coupled to said support member.

19. A disc brake assembly according to claim 18, wherein said float bosses and said float washers are located on opposite axial sides of said support member.

20. A disc brake assembly according to claim 19, wherein each of said float washers has an axial bore that receives a portion of a corresponding one of said float bosses.

\* \* \* \* \*